July 25, 1933. J. V. DOZIER 1,920,006
PROSTATIC CATHETER
Filed July 26, 1932
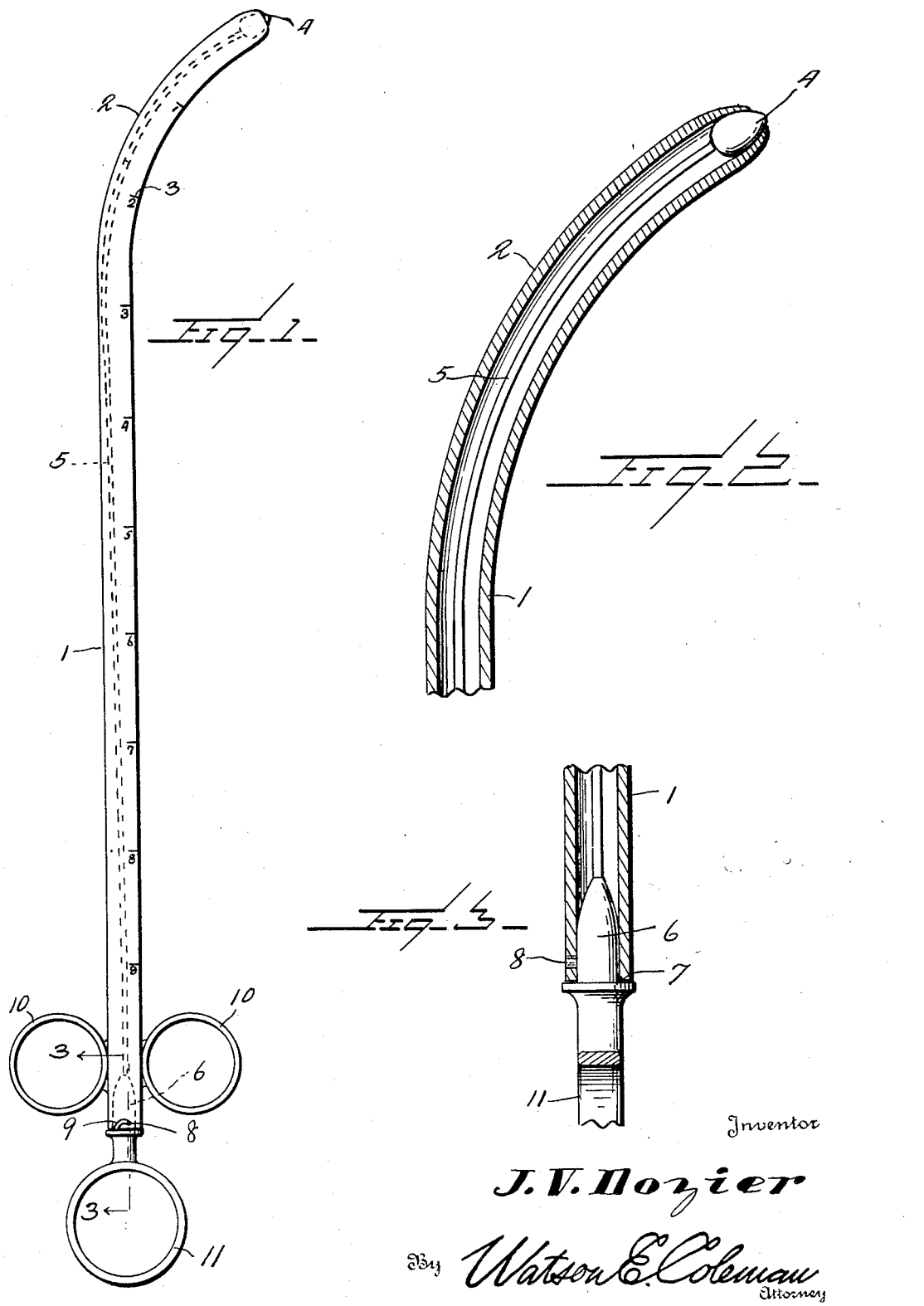
Inventor
J. V. Dozier
By Watson E. Coleman
Attorney …

UNITED STATES PATENT OFFICE

JOSEPH V. DOZIER, OF FLATONIA, TEXAS, ASSIGNOR OF ONE-FOURTH TO EDWARD A. ARNIM, JR., AND ONE-FOURTH TO DE FAY JOHNSON, BOTH OF FLATONIA, TEXAS

PROSTATIC CATHETER

Application filed July 26, 1932. Serial No. 624,847.

This invention relates to a prostatic catheter, and it is an object of the invention to provide an instrument of this kind comprising an elongated rigid tube, sheath, or canula preferably of metal and open at both ends, together with an obturator or bulbous member for closing the distal end of the tube, sheath or canula and wherein said obturator or bulbous member can be readily withdrawn through the tube, sheath or canula whereby it is possible to insert a self-retaining catheter by means of a flexible introducer or a regular soft rubber catheter.

Another object of the invention is to provide an instrument of this kind comprising an elongated tube, sheath or canula together with an obturator or bulbous member for closing the distal end of the tube, sheath or canula when the same is being introduced, said obturator or bulbous member having associated therewith means whereby the same can be readily removed out through the tube, sheath or canula while applied.

It is also an object of the invention to provide an instrument of this kind wherein means are provided to prevent the obturator or bulbous member passing out beyond the distal end of the instrument, together with releasable means for locking or holding said obturator in desired applied position at the distal end of the instrument.

An additional object of the invention is to provide an instrument of this kind provided with means whereby the exact location of an impassable stricture in the urethra can be determined.

The invention consists in the details of construction and in the combination and arrangement of the several parts of my improved prostatic catheter whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in side elevation of a catheter constructed in accordance with an embodiment of my invention;

Figure 2 is a fragmentary view partly in section and partly in elevation of the distal end of the instrument as illustrated in Figure 1;

Figure 3 is an enlarged fragmentary sectional view with parts in elevation, the line of section being substantially on the line 3—3 of Figure 1.

As herein embodied my improved instrument comprises a tube, sheath or canula 1 of desired dimensions and which has its distal end portion 2 disposed on a predetermined curvature. This portion 2 it is to be noted is disposed on such a radius to allow ease of insertion in cases of enlarged prostate. This ease of insertion is also further facilitated by having the curved portion 2 of material length.

The tube, sheath or canula 1 is open at its opposite ends and along its periphery it is provided with graduations 3 spaced to provide a scale in inches. This scale is of importance and advantage as it provides means whereby upon the distal end of the instrument reaching an impassable stricture, the exact location in the urethra can be determined.

When applying the instrument the distal end of the tube, sheath or canula 1 is closed by the elongated obturator or bulbous member 4. This obturator or member 4 snugly fits within the bore of the tube, sheath or canula 1 yet is free to travel therethrough so that the same can be readily applied or removed as desired. When in working position, as indicated in Figures 1 and 2 of the accompanying drawing, the obturator or member 4 projects beyond the adjacent distal end of the tube, sheath or canula so that said obturator or member 4 serves as a guide or pilot to facilitate the insertion of the instrument.

The obturator or member 4 is fixed to the extremity of an elongated resilient member 5, preferably wire of requisite gauge, and the opposite extremity of the member or wire 5 is secured to a nipple 6 which engages within the posterior end of the tube, sheath or canula 1. This nipple 6 is provided with an outstanding surrounding flange or shoulder 7 for direct contact with the posterior end of the tube, sheath or canula 1 whereby the extent of insertion of the nipple is limited.

The bore or caliber of the tube, sheath or canula decreases slightly at the extreme distal end to form a seat against which the bulbous end of the obturator 4 rests so that the obturator or member 4 is prevented from passing entirely out beyond the distal end and also to have a predetermined extent of such projection. The length of the member or wire 5 from the inner end of the obturator 4 to the shoulder 7 is slightly greater than the distance through the tube, sheath or canula 1 from the posterior end to the portion at the distal end upon which the obturator 4 seats. This is of advantage because when the nipple 6 is locked to the posterior end portion of the tube, sheath or canula, as will be hereinafter referred to, the inherent resiliency of the member or wire 5 will result in the obturator 4 being forced against and held to its seat at the distal end of the tube, sheath or canula. This spring tension serves to hold the obturator 4 against retraction during the operation of inserting the tube, sheath or canula.

The nipple 6 is provided with an outstanding and laterally directed pin 8 which is received within a bayonet slot 9 provided in the wall of the tube, sheath or canula 1 at the posterior end whereby the obturator or member 4 is effectively locked in working position yet allowing its ready release when it is desired to withdraw the obturator or member 4 out through the posterior end of the tube, sheath or canula 1.

The posterior end portion of the tube, sheath or canula 1, as illustrated in Figure 1, is provided with the oppositely disposed handle rings 10 while the outer portion of the nipple 6 is also provided with a handle ring 11. I do not, however, wish to be confined to these rings 10 and 11 as other types of handle members may be used with equal facility.

The portion 2 of the tube, sheath or canula 1 is disposed on a curvature which will allow it to ride easily over the prostate, such curvature also facilitating the ease with which the instrument can be introduced.

After the instrument has been applied, the obturator or member 4 is withdrawn out through the posterior end of the instrument and a self-retaining catheter passed through the tube, sheath or canula 1 by means of a flexible introducer. After this operation the tube, sheath or canula 1 is removed leaving the self-retaining catheter in the bladder.

Where a self-retaining catheter is not readily obtainable, good results can be obtained by the use of a regular soft rubber catheter. My technic with the soft rubber catheter is the same as that employed when using the self-retaining catheter, except that no introducer is needed as the rubber catheter will slide easily through the tube, sheath or canula 1. I then allow the rubber catheter to protrude about two inches beyond the meatus and anchor it in place by fastening adhesive from the protruding end of the catheter, down the sides of the penis, anchoring the instrument to the pubis. When the well known type of all rubber catheter is used the funnel end should always be cut off so that it will slide easily through the tube, sheath or canula.

If it is necessary to cut the stricture, the catheter can be used for a cocaine depositor by removing the obturator or member 4 out through the posterior end of the instrument, inserting a tablet in the tube, sheath or canula, and then using the obturator to push the tablet to the point of the stricture.

From the foregoing description it is thought to be obvious that a prostatic catheter constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A prostatic catheter comprising a canula open at opposite ends, an obturator for closing the distal end of the canula, said obturator being insertible into the canula through the posterior end thereof, an elongated resilient member secured at one extremity to the obturator, and a nipple carried by the opposite end portion of the obturator engaging within the posterior end of the canula, the distal end portion of the canula having a seat engaged by the obturator to limit the extent of movement of the obturator toward the distal end of the canula.

2. A prostatic catheter comprising a canula open at opposite ends, an obturator for closing the distal end of the canula, said obturator being insertible into the canula through the posterior end thereof, an elongated resilient member secured at one extremity to the obturator, a nipple carried by the opposite end portion of the obturator engaging within the posterior end of the canula, the distal end portion of the canula having a seat engaged by the obturator to limit the extent of movement of the obturator toward the distal end of the canula; and coacting means carried by the canula and the nipple for locking the obturator in its closing position at the distal end of the canula.

3. A prostatic catheter comprising a canula open at opposite ends, the distal end portion of the canula being provided with an internal seat, an obturator insertible into the canula through the posterior end thereof for engagement with the internal seat for closing the distal end of the canula, an elongated resilient member secured to the obturator for applying or removing the obturator, and means for anchoring the posterior portion of said resilient member to the canula when the obturator is engaged with its seat.

JOSEPH V. DOZIER.